United States Patent [19]
Dalferth et al.

[11] 4,161,100
[45] Jul. 17, 1979

[54] ATTACHMENT DEVICE FOR SECURING STRUCTURAL PARTS TO A CHAIN

[76] Inventors: Hans H. Dalferth, Haydenstrasse 21, 708 Aalen-Wasseralfingen; Dieter A. G. Mauer, Stämmesäckerstrasse 93, 741 Reutlingen, both of Fed. Rep. of Germany

[21] Appl. No.: 880,570

[22] Filed: Feb. 23, 1978

[30] Foreign Application Priority Data

Mar. 8, 1977 [DE] Fed. Rep. of Germany ....... 2710550

[51] Int. Cl.² ............................................ F16G 15/00
[52] U.S. Cl. ..................................................... 59/93
[58] Field of Search .................. 59/93, 78, 84, 85, 86; 24/116 R

[56] References Cited
FOREIGN PATENT DOCUMENTS

| | | | |
|---|---|---|---|
| 204851 | 8/1959 | Austria ......................................... | 59/85 |
| 1269428 | 5/1968 | Fed. Rep. of Germany .............. | 59/85 |
| 1922146 | 11/1970 | Fed. Rep. of Germany .............. | 59/84 |
| 571185 | 8/1945 | United Kingdom ........................ | 59/84 |

*Primary Examiner*—Victor A. DiPalma
*Assistant Examiner*—Gene P. Crosby
*Attorney, Agent, or Firm*—Parmelee, Johnson, Bollinger & Bramblett

[57] ABSTRACT

A replaceable centering piece in an attachment device for securing structural parts to a chain by means of a bolt and two flanges being clamped across the two arms of a chain link by said bolt, said replaceable centering piece having end walls which are in contact with the curved ends of two adjacent chain links which engage with the chain link carrying the attachment device.

7 Claims, 4 Drawing Figures

ATTACHMENT DEVICE FOR SECURING STRUCTURAL PARTS TO A CHAIN

The invention relates to an attachment device for securing structural parts to a chain of the kind in which two flanges are clamped across the two arms of a chain link by a bolt which penetrates through the link, the wings of the flanges clamping the arms of the link between them, the bolt also serving for attaching the structural part to the chain.

Such a device is already known and is not entirely satisfactory because it is not reliably centred with respect to the chain link to which it is attached. There is a risk that when the device is being attached to the chain, the clamping flanges assume incorrect positions, with the consequence that uneven loads are applied to the chain links which are attached to the link carrying the attachment device.

The risk could, in principle, be obviated by giving the clamping flanges centering projections, but this would be useful only to a limited extent, because it would not be possible to use attachment devices of the same size with chain links of the same bar diameter but of different internal lengths.

One object of the present invention is to provide an attachment device of the kind mentioned above but which is equipped with means for ensuring that it is always correctly positioned, even with respect to chain links of different internal lengths.

Accordingly the invention provides an attachment device for securing structural parts to a chain, in which two flanges are clamped across the two arms of a chain link by a bolt which penetrates through the link, the wings of the flanges clamping the arms of the link between them, the bolt also serving for attaching the structural part to the chain, characterized in that between the two flanges the bolt supports a replaceable centering piece which has end walls which are in contact with the curved ends of two adjacent chain links which engage with the chain link carrying the attachment device, the adjacent chain links being spaced apart by the centering piece.

The attachment device according to the invention has the advantage that during assembly it always assumes exactly the same position with respect to the chain link to which it is attached without it being necessary for the operator to make measurements to ensure this. Adaptation to a link of different internal length is obtained simply by replacing the centering piece with a different one, the other parts of the attachment device remaining the same.

The invention will now be described in greater detail on the basis of the two examples represented in the drawing, in which.

Figure 1:
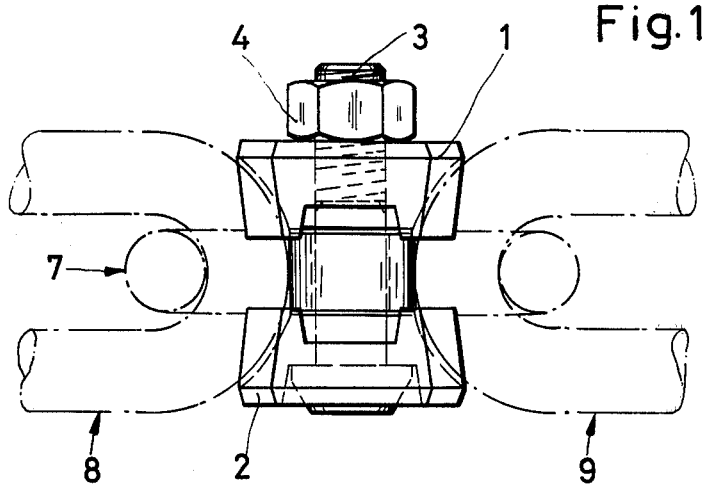
FIG. 1 is a side view of the attachment device.

FIG. 1 shows two clamping flanges 1 and 2 which are held firmly in contact by a bolt 3 and a nut 4, with the two arms 5, 6 of a round steel chain link 7, which connects together two chain links 8, 9.

The attachment device is centered between the arms of the chain link 7 by a replaceable centering piece 10, through which the bolt 3 penetrates. The centering piece 10 has two flat sides 11, 12 and two curved end walls 13, 14 opposite the curved ends of the chain links 8, 9.

In practice, flanges 1, 2 of the same dimensions can be used with chain links of different bar diameters. Different internal lengths in the chain links are compensated by using different centering pieces. To prevent excessive abrasion of the curved ends of the outer chain links 8, 9 the centering piece is made of a resilient plastic or of a bearing bronze.

Figure 2:
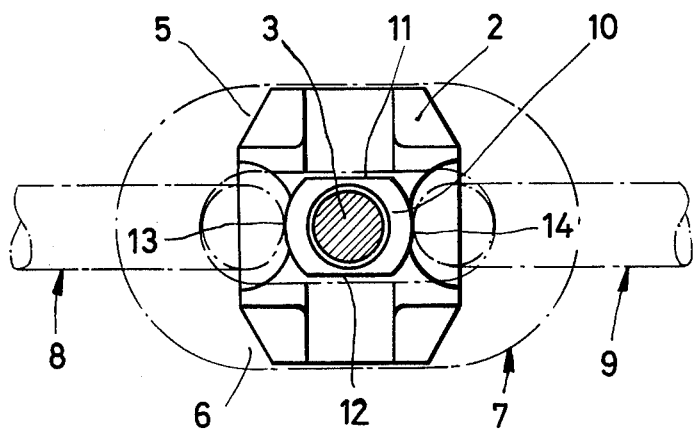
FIG. 2 is a plan view showing the lower flange and the centering piece of the attachment device of FIG. 1.
Figure 3:
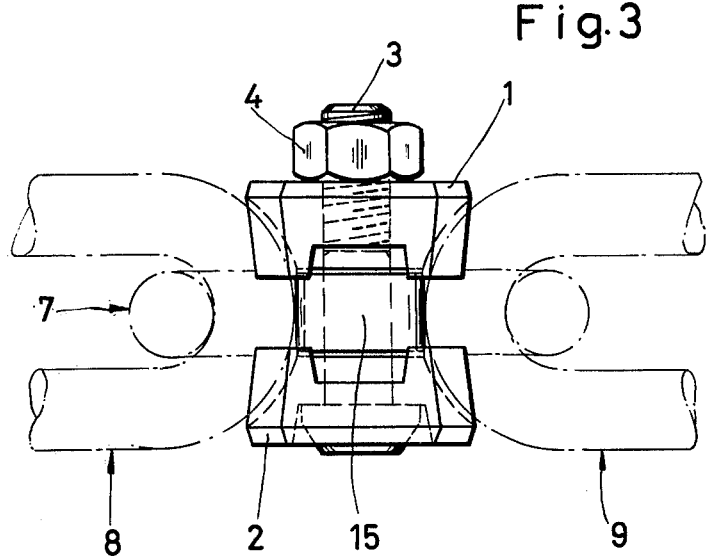
FIG. 3 is a side view of a second version of the attachment device.
Figure 4:
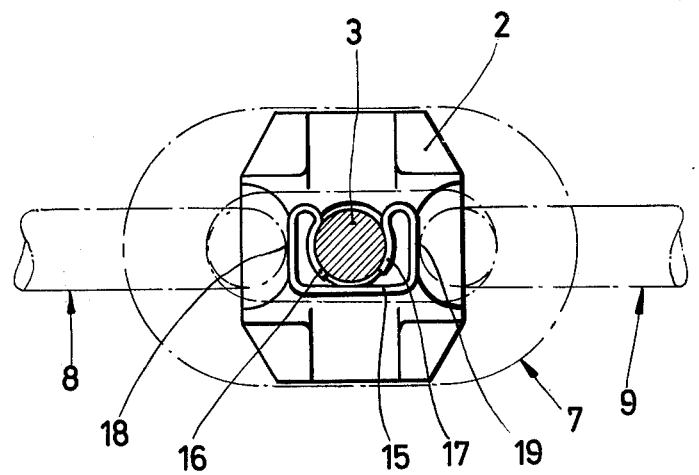
FIG. 4 is a plan view showing the lower flange and the centering piece of the attachment device of FIG. 3.

The version shown in FIGS. 3 and 4 differs from the version of FIGS. 1 and 2 only in that the centering piece is different. All other parts therefore retain the same index numbers as they have in FIGS. 1 and 2.

In the second version of the attachment device the centering piece is a substantially U-shaped spring 15 with inwards-bent spring ends 16, 17 thrusting resiliently inwards against the shaft of bolt 3 and, substantially parallel to these, outer arms 18, 19 which thrust resiliently outwards against the curved ends of the chain links 8, 9. It should be observed that both versions of the attachment device automatically centre the flanges 1, 2 when the attachment device is being installed in the chain.

By using a centering piece 15 which grips the bolt 3 tightly enough, the bolt with the centering piece and the lower flange 2 can be put together to form a pre-assembled unit, to facilitate insertion of the attachment device into the chain.

I claim:

1. An attachment device for securing structural parts to a chain, in which two flanges are clamped across the two arms of a chain link by a bolt which penetrates through the link, the wings of the flanges clamping the arms of the link between them, the bolt also serving for attaching the structural part to the chain, characterized in that between the two flanges the bolt supports a replaceable centering piece which has end walls which are in contact with the curved ends of two adjacent chain links which engage with the chain link carrying the attachment device, the adjacent chain links being spaced apart by the centering piece.

2. An attachment device according to claim 1, characterized in that the centering piece is a sleeve with flat side walls.

3. An attachment device according to claim 2, characterized in that the centering piece is made at least in part of a flexible material.

4. An attachment device according to claim 2, characterized in that the centering piece is made at least in part of an anti-friction bearing material.

5. An attachment device according to claim 1, characterized in that the centering piece consists of a substantially U-shaped spring with inwards-bent spring ends.

6. An attachment device according to claim 1, characterized in that the centering piece frictionally grips the shaft of the bolt.

7. An attachment device according to claim 1, characterized in that the two flanges have the same shape.

* * * * *